US011675600B2

(12) United States Patent
Liu et al.

(10) Patent No.: US 11,675,600 B2
(45) **Date of Patent: *Jun. 13, 2023**

(54) COMPUTING METHOD AND APPARATUS WITH MULTI-PHASE/LEVEL BOOT

(71) Applicant: Intel Corporation, Santa Clara, CA (US)

(72) Inventors: Shuo Liu, Shanghai (CN); Yipeng Yao, Shanghai (CN); Hu Chen, Shanghai (CN); Yifan Zhang, Shanghai (CN); Jia Bao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/054,713

(22) PCT Filed: Dec. 18, 2018

(86) PCT No.: PCT/CN2018/121724

§ 371 (c)(1),
(2) Date: Nov. 11, 2020

(87) PCT Pub. No.: WO2020/124354

PCT Pub. Date: Jun. 25, 2020

(65) Prior Publication Data

US 2021/0064384 A1 Mar. 4, 2021

(51) Int. Cl.
*G06F 9/00* (2006.01)
*G06F 15/177* (2006.01)
(Continued)

(52) U.S. Cl.
CPC .......... *G06F 9/4406* (2013.01); *G06F 9/4403* (2013.01); *G07C 5/0841* (2013.01)

(58) Field of Classification Search
CPC ............................. G06F 9/4406; G06F 9/4403
See application file for complete search history.

(56) References Cited

U.S. PATENT DOCUMENTS

2002/0047590 A1* 4/2002 Kawano .................. G06F 9/451 315/169.4
2003/0060911 A1* 3/2003 Chan ....................... G06F 3/162
(Continued)

FOREIGN PATENT DOCUMENTS

CN 104778066 A 7/2015
WO WO2014042870 A1 3/2014

OTHER PUBLICATIONS

International Search Report and Written Opinion dated Sep. 18, 2019 for International Patent Application No. PCT/CN2018/121724, 10 pages.

*Primary Examiner* — Mohammed H Rehman
(74) *Attorney, Agent, or Firm* — Schwabe, Williamson & Wyatt, P.C.

(57) ABSTRACT

Apparatuses, methods and storage medium associated with multi-phase/level boot technology, are disclosed herein. In embodiments, a method may include resuming an initial execution image of a computing platform from persistent storage to execute an initial task; and subsequently, resuming a full execution image of the computing platform from the persistent storage to execute one of a plurality of operational tasks. Other embodiments are also described and claimed.

23 Claims, 9 Drawing Sheets

(51) Int. Cl.
*G06F 9/4401* (2018.01)
*G07C 5/08* (2006.01)

(56) References Cited

U.S. PATENT DOCUMENTS

| | | | | |
|---|---|---|---|---|
| 2006/0259642 | A1* | 11/2006 | Du | G06F 1/3203 709/247 |
| 2007/0266389 | A1 | 11/2007 | Ganguly et al. | |
| 2009/0172379 | A1* | 7/2009 | Rothman | G06F 8/456 713/2 |
| 2009/0287900 | A1* | 11/2009 | Kirscht | G06F 9/4406 711/E12.002 |
| 2010/0106895 | A1* | 4/2010 | Condit | G06F 12/0804 711/E12.001 |
| 2013/0117762 | A1* | 5/2013 | Yamashita | G06F 9/485 719/313 |
| 2014/0195792 | A1 | 7/2014 | Chew | |
| 2015/0178097 | A1 | 6/2015 | Russinovich | |
| 2016/0306624 | A1* | 10/2016 | Vangelov | H04L 67/12 |
| 2017/0131928 | A1* | 5/2017 | Cui | G06F 3/0665 |
| 2018/0253556 | A1* | 9/2018 | Karaginides | G06F 21/572 |
| 2020/0349780 | A1* | 11/2020 | Nakamoto | B60W 50/045 |
| 2020/0364040 | A1* | 11/2020 | Chao | G06F 9/44536 |

* cited by examiner

COMPUTING METHOD AND APPARATUS WITH MULTI-PHASE/LEVEL BOOT

CROSS REFERENCE TO RELATED APPLICATIONS

The present application is a national phase entry under 35 U.S.C. § 371 of International Application No. PCT/CN2018/121724, filed Dec. 18, 2018, entitled "COMPUTING METHOD AND APPARATUS WITH MULTI-PHASE/LEVEL BOOT", which designated, among the various States, the United States of America. The Specifications of the PCT/CN2018/121724 Application is hereby incorporated by reference.

TECHNICAL FIELD

The present disclosure relates to the field of computing. More particularly, the present disclosure relates to computing method and apparatus with multi-phase/level boot, having particular applications to in-vehicle systems of computer-assisted or autonomous driving (CA/AD) vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Client and embedded computing systems usually suffer from long reboot delay. A fast boot is very much desired from user experience perspective. Furthermore, in certain kind of systems fast boot is mandatory. These systems may even have multiple timing critical phases in the boot sequence. Automotive Software Defined Cockpit system is such an example. The exterior rear-view camera system is expected to be ready as early as possible (within 2 sec); Splash window (or vendor logo) is expected to be displayed within 4 secs; and finally the boot to complete HMI (Human Machine Interface) is expected to finish within 10 sec. These may be very challenging performance targets for a number of today's computing platforms.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
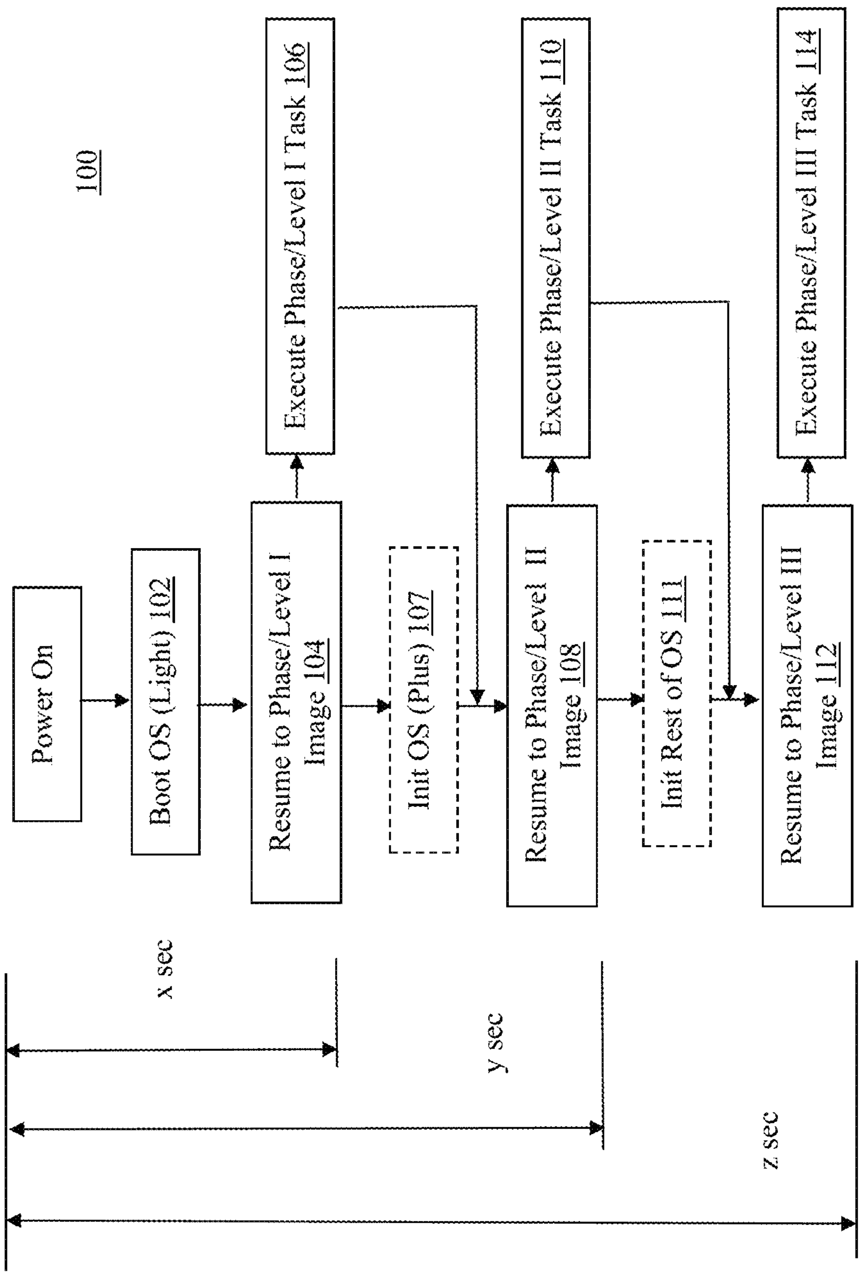
FIG. 1 illustrates an overview of the multi-phase/level boot process of the present disclosure, according to various embodiments.

To address challenges discussed in the background section, apparatuses, methods and storage medium associated with multi-phase/level boot technology, are disclosed herein. In various embodiments, a method of computing includes resuming an initial execution image of a computing platform from persistent storage of the computing platform to execute an initial task. The initial execution image includes the initial task, and was pre-saved in the persistent storage as if it is a suspend to persistent storage image of a suspend process performed immediately before the computing platform was last powered off with the computing platform having only an operating system at an initial level of functionalities, and the initial task. The method further comprises subsequently, resuming a full execution image of the computing platform from the persistent storage to selectively execute a plurality of operational tasks. The full execution image includes the plurality of operational tasks, and was pre-saved in the persistent storage as part of a suspend process performed immediately before the computing platform was last powered off with the computing platform having the operating system at a full level of functionalities with more functionalities than the initial level of functionalities, and the plurality of operational tasks.

In various embodiments, the method further includes subsequent to execution of the initial task, but prior to resuming the full execution image of the computing platform, resuming an intermediate execution image of the computing platform from persistent storage of the computing platform to execute an intermediate task. The intermediate execution image includes the intermediate task, and was pre-saved in the persistent storage as if it is a suspend to persistent storage image of a suspend process performed immediately before the computing platform was last powered off with the computing platform having the operating system at an intermediate level of functionalities with more functions than the initial level of functionalities but less functions than the full level of functionalities, and the intermediate task.

In various embodiments, at least one computer-readable medium (CRM) having instructions stored therein, to cause a computing platform, in response to execution of the instruction by the computing platform, to operate an operating system to receive execution control, after the operating system has been booted to an initial level of functionalities. Further, on receipt of execution control, in lieu of booting the rest of the operating system, initiate a resume process to resume an initial execution image from persistent storage accessible to the computing platform. The initial execution image has a stateless initial task, and was pre-saved in the persistent storage as if it is a suspend to persistent storage image of a suspend process performed immediately before the computing platform was last powered off with the computing platform having only the operating system at the initial level of functionalities, and the stateless initial task.

In various embodiments, execution of the instructions further causes the computing platform to operate the operating system to subsequently initiate another resume process to resume a full execution image from the persistent storage of the computing platform. The full execution image has a plurality of operational tasks, and was saved in the persistent storage as part of a suspend process performed immediately before the computing platform was last powered off with the computing platform having the operating system at a full level of functionalities and the plurality of operational tasks.

In various embodiments, execution of the instructions further causes the computing platform to operate the operating system to initiate another resume process to resume an intermediate execution image from the persistent storage, subsequent to the resumption of the initial execution image, prior to the resumption of the full execution image. The intermediate execution image has a stateless intermediate task, and was pre-saved in the persistent storage as if it is a suspend to persistent storage image of a suspend process performed immediately before the computing platform was last powered off with the computing platform having only the operating system at the intermediate level of functionalities, and the stateless intermediate task.

In various embodiments, an apparatus for computing, includes a computing platform disposed in a vehicle, having a hypervisor to host a service virtual machine (SVM) and one or more user virtual machines (UVMs), a boot program, integral of the computing platform, and the OS of the SVM. The boot program is arranged to receive a request to power on or boot the computing platform. The boot program, in response to receipt of the request, boots the hypervisor to an initial level of functionalities, which on having been booted to the initial level of functionalities, launches the SVM and initializes an operating system (OS) of the SVM to an initial level of functionalities. The OS of the SVM, on receipt of execution control after the OS has been initialized to the initial level of functionalities, in lieu of booting the rest of the OS, initiates a resume process to resume an initial execution image from persistent storage of the computing platform. The initial execution image has an initial task, and was pre-saved in the persistent storage as if it is a suspend to persistent storage image of a suspend process performed immediately before the SVM was last shut down with the SVM having only the OS at the initial level of functionalities, and the initial task. An example of the initial task is a rear view camera task.

In various embodiments, the OS of the SVM is further arranged to subsequently initiate another resume process to resume a full execution image from the persistent storage. The full execution image has a plurality of operational tasks, and was saved in the persistent storage as part of a suspend process performed immediately before the SVM was last shut down, with the SVM having the OS at a full level of functionalities and the plurality of operational tasks. Examples of the operational tasks are instrument cluster tasks.

In various embodiments, the OS of the SVM is further arranged to initiate another resume process to resume an intermediate execution image from the persistent storage, subsequent to the resumption of the initial execution image, but prior to the resumption of the full execution image. The intermediate execution image has an intermediate task, and was pre-saved in the persistent storage as if it is a suspend to persistent storage image of a suspend process performed immediately before the SVM was last shut down with the SVM having only the OS at the intermediate level of functionalities, and the intermediate task. An example of the intermediate task is a splash window (vendor logo) task.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a combinational logic circuit, a processor (shared, dedicated, or group) and/or memory (shared, dedicated, or group) that execute one or more software or firmware programs, and/or other suitable components that provide the described functionality.

Referring now to FIG. 1, wherein an overview of the multi-phase/level boot process of the present disclosure, according to various embodiments, is shown. As illustrated, process 100 for booting a client or embedded computing platform in multiple phases, each phase with increasing level of functionalities, includes operations performed at blocks 102-114. On receipt of a request to power on or cold boot the client/embedded computing platform, at block 102, the OS of the client/embedded computing platform is booted to an initial state configurable to provide an initial level of functionalities (light), e.g., with just enough functionalities to support execution of an initial task.

Next, at block 104, on booting the OS of the client/embedded computing platform to the initial state configurable to provide the initial level of functionalities (light), a resume process may be initiated to resume execution of an initial execution image, also referred to as phase I or level I execution image. The initial execution image includes substantially the data to configure the (light) OS at the initial level of functionalities, and the initial task, also referred to as the phase I or level I task. The initial execution image including the data to configure the (light) OS at the initial level of functionalities and the initial task is pre-saved in persistent storage of the client/embedded computing platform as if it is a "suspended to persistent storage" image of a suspend process executed just prior to the last time the client/embedded computing platform was fully powered off. On resumption, with the (light) OS reconfigured at the initial level of functionalities, at block 106, execution control is transferred to the initial task, to execute the initial task.

In various embodiments, the imaginary "suspend process," and the resume process may be any one of a number of known suspend to and resume from persistent storage processes known in the art. The initial task may be a stateless task. Thus, the phase I booting, or booting of the client/embedded computing platform to the point with the initial task available can be accomplished in a relatively short x seconds.

Continuing to refer to FIG. 1, in various embodiments, while the initial task is being executed, at block 107, the OS may be optionally further initialized to be configurable to provide the next level of functionalities (plus), if necessary, also referred to as phase II or level II functionalities. The operations may be performed e.g., for embodiments, where execution of the next task, also referred to as an intermediate task requires more functionalities of the OS; otherwise, further initialization of OS to be configurable to provide the phase II or level II functionalities at block 107 may be skipped.

Next, at block 108, on completion of execution of the initial task, or on idling of the initial task, another resumption process may be initiated to resume execution of an intermediate execution image, also referred to as phase II or level II execution image. The intermediate execution image includes substantially the data to configure the (plus) OS at the intermediate level of functionalities, and the intermediate task, also referred to as the phase II or level II task. The intermediate execution image including the data to configure the (plus) OS at the intermediate level of functionalities and the intermediate task is similarly pre-saved in persistent storage of the client/embedded computing platform as if it is a "suspended to persistent storage" image of a suspend process executed just prior to the last time the client/embedded computing platform was fully powered off. On resumption, with the (plus) OS reconfigured at the intermediate level of functionalities, at block 110, execution control is transferred to the intermediate task, to execute the intermediate task. In various embodiments, the resumption of intermediate execution image may be performed in the background, and switched to the foreground when the resumption is complete and the intermediate task is available/ready for execution.

Similar to phase I or level I, the imaginary "suspend process," and the resume process employed for phase II or level II may be any one of a number of known suspend to and resume from persistent storage processes known in the art. The intermediate task may also be a stateless task. Thus, the phase II booting, or booting of the client/embedded computing platform to the point with the intermediate task available can be accomplished in a relatively short y seconds, slightly beyond x sec.

Still referring to FIG. 1, in various embodiments, while the intermediate task is being executed, at block 111, the OS may be optionally further initialized to be configurable to provide the full level of functionalities, if necessary, also referred to as phase III or level III functionalities. The operations may be performed e.g., for embodiments, where execution of the intermediate task did not require the full level of functionalities of the OS; otherwise, further initialization of OS to be configurable to provide the full level of functionalities at block 111 may be skipped.

Next, at block 112, on completion of execution of the intermediate task, or on idling of the intermediate task, another resumption process may be initiated to resume execution of a full execution image, also referred to as phase III or level III execution image. The fill execution image includes substantially the data to configure the OS at the full level of functionalities, and a plurality of operational tasks, also referred to as the phase III or level III tasks. The full execution image including the data to configure the OS at the full level of functionalities and the plurality of operational tasks is saved in persistent storage of the client/embedded computing platform as part of a suspend process executed just prior to the last time the client/embedded computing platform was fully powered off. On resumption, with the OS reconfigured at the full level of functionalities, at block 114, execution control is transferred to one of operational tasks, to begin selective execution of the operational tasks. In various embodiments, the resumption of full execution image may be similarly performed in the background, and switched to the foreground when the resumption is complete and the plurality of operational tasks are available/ready for execution.

Similar to phases I and II or levels I & II, the suspend and resume processes employed for phase III or level III may be any one of a number of known suspend to and resume from persistent storage processes known in the art. The plurality of operational tasks may be stateless tasks or tasks with states. With phase/level I and II achieved in relatively short x and y seconds, the phase III booting, or booting of the client/embedded computing platform to the point with the operational tasks available can be accomplished in due course in z sec, as long as it is necessary or suitable for a particular application.

Before further describing the multi-phase/level booting of the present disclosure, it should be noted that the phrase "full level of functionalities" does not mean that the functions of the OS cannot be further expanded e.g., by virtue of additional plug in and so forth. The phase is intended to convey the target set of functionalities of the client/embedded computing platform at completion of a cold boot or resumption.

Further, while process 100 has been described with 3 phases or levels of booting, the present disclosure is not so limited. Process 100 may be practiced with more phases/levels, e.g., more "intermediate" phases/levels, or less phases/levels, e.g., without any intermediate phase/level.

Figure 2:
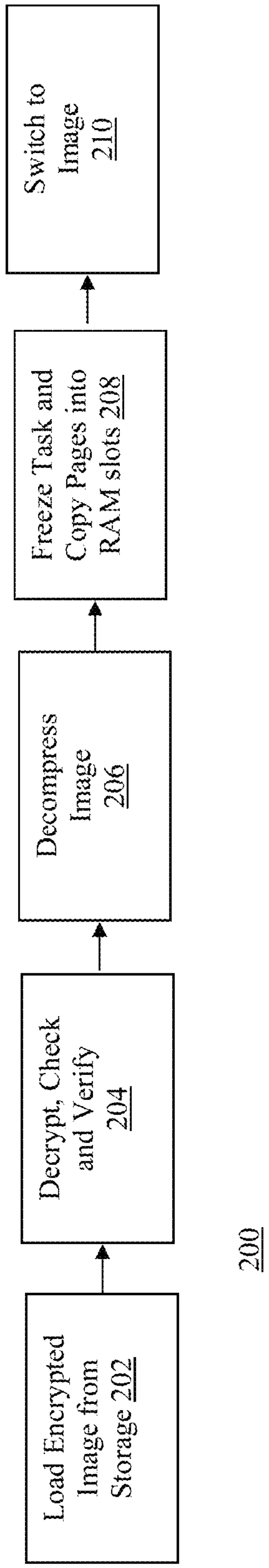
FIG. 2 illustrates an example resume process for each of the resumption of execution image of FIG. 1 in further detail, according to various embodiments.

Referring now to FIG. 2, wherein an example resume process for each of the resumption of execution images of FIG. 1, according to various embodiments, is shown. For the illustrated embodiments, process 200 for resuming execution of a suspended execution image assumes the suspend process compress the execution image as well as encrypts the compressed execution images for security purpose. Process 200 includes operations performed at blocks 202-210.

At block 202, the encrypted suspended to persistent storage execution image is loaded back into a working area of memory of the client/embedded computing platform. Next, at block 204, the reloaded encrypted execution image is decrypted. On decryption, the plain text execution image is checked and verified to ensure it is authentic and has not been compromised. Authentication and verification may be accomplished with any one of a number of authentication/verification techniques known in the art. At block 206, the authenticated/verified execution image is decompressed.

At block 208, the decompressed execution image is copied from the working storage into the appropriate memory slots. At block 208, for each of the subsequent phase/level, e.g., phase/level II or phase/level III, the initial/intermediate task is stopped, idled or otherwise frozen, while the copy is in progress.

Lastly, at block 210, on completion of the copying, execution may be switched to the latest newly resumed/reconstructed execution image.

Figure 3:
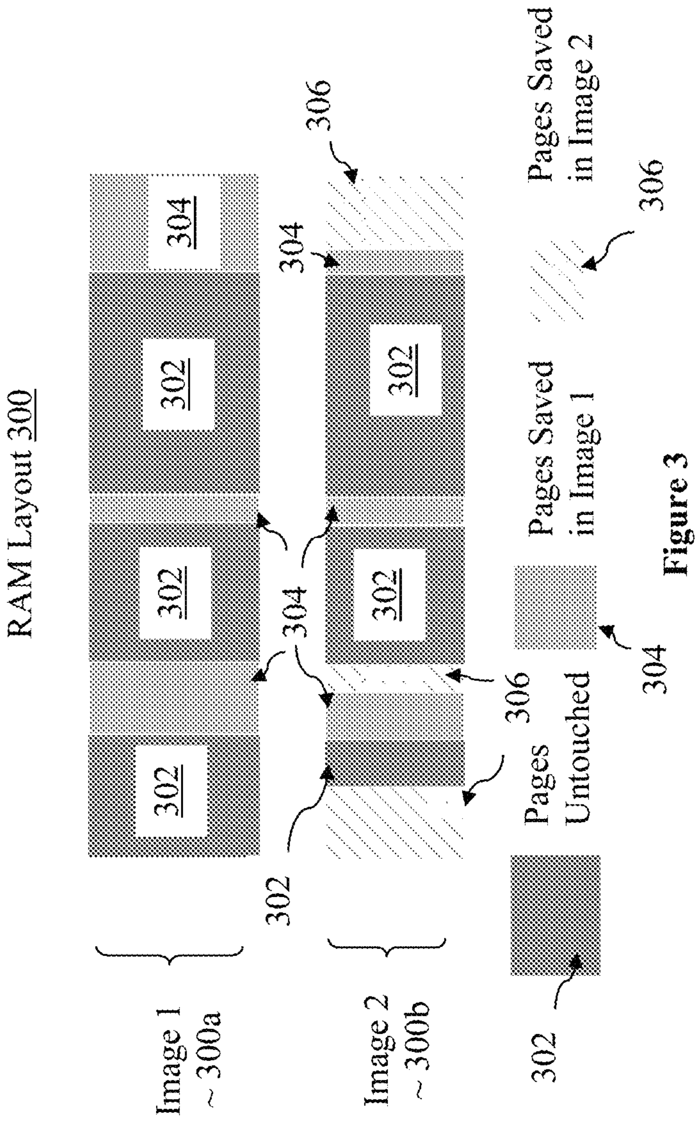
FIG. 3 illustrates an example memory layout for multi-phase/level booting in further detail, according to various embodiments.

Referring now to FIG. 3, wherein an example memory layout for the multi-phase/level booting process, according to various embodiments, is shown. As illustrated, for the example embodiments, when the phase/level I resume process reloads the initial execution image 300*a* into memory, and reconfigure the (light) OS to the initial level of functionalities, the various pieces 304 of the initial execution image having the initial portions of the OS to be configured to provide the initial level of functionalities and the initial task, are copied into the respective memory slots/pages. The other memory slots/pages 302 are untouched.

When the phase/level II resume process reloads the intermediate execution image 300*b* into memory, and reconfigure the (plus) OS to the intermediate level of functionalities, the various pieces 306 of the intermediate execution image having the intermediate portions of the OS to be configured to provide the additional intermediate level of functionalities and the intermediate task, are copied into the respective memory slots/pages. Some pieces 306 may copied into portions of previously untouched memory slots/pages 302, while others may be copied into and replace the content of portions of the memory slots/pages 304 used by the initial execution page 300*a*.

The copying process (including overlaying) may be repeated for each subsequent phase/level, until resumption/reloading of the full execution image is completed.

Figure 4:
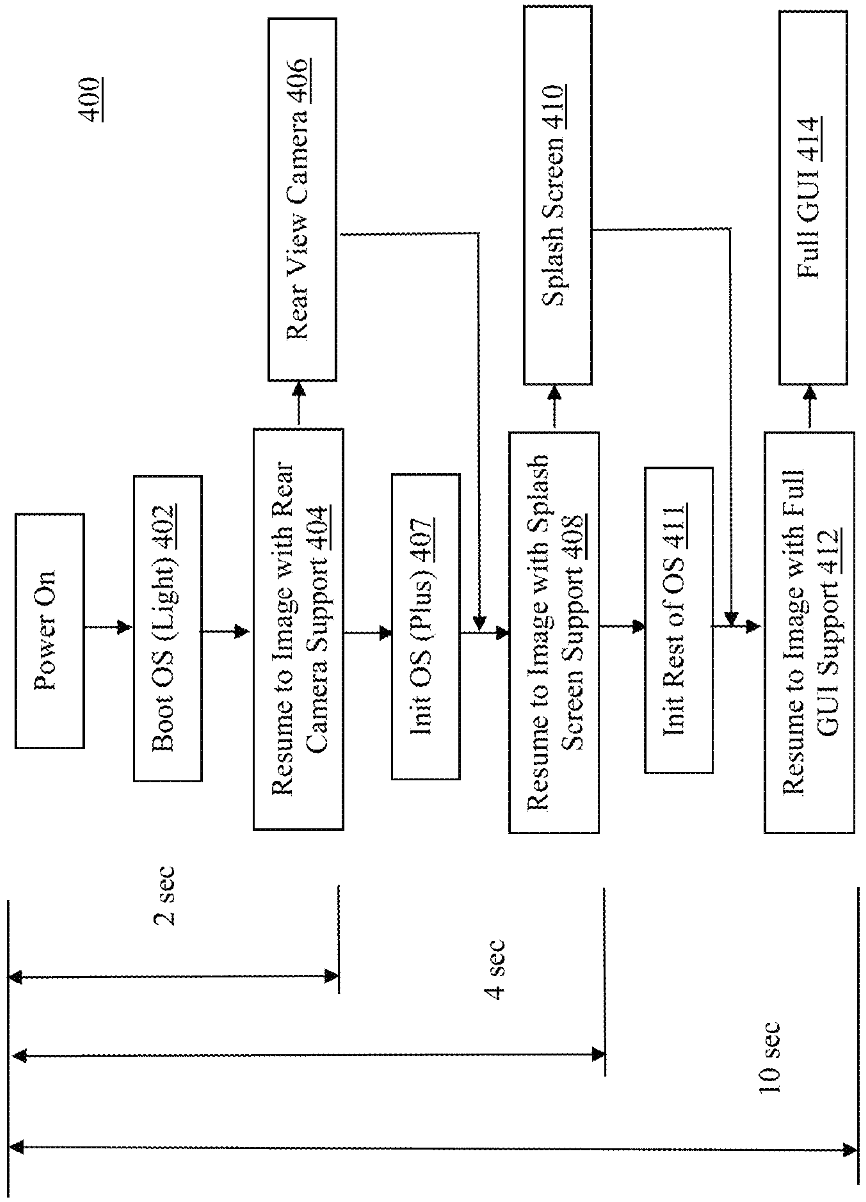
FIG. 4 illustrates an overview of an example multi-phase/level boot process as practiced for an in-vehicle system, according to various embodiments.

Referring now FIG. 4 wherein an overview of an example multi-level boot process as practiced by an in-vehicle system, according to various embodiments, is shown. As illustrated, process 400 for booting an in-vehicle system in multiple phases, each phase with increasing level of functionalities, includes operations performed at blocks 402-414. On receipt of a request to power on or cold boot the in-vehicle system, at block 402, the OS of the in-vehicle system is booted to an initial state configurable to provide an initial level of functionalities (light), e.g., with just enough functionalities to support execution of a rear view camera task.

Next, at block 404, on booting the OS of the in-vehicle system to the initial state configurable to provide the initial level of functionalities (light), a resume process may be initiated to resume execution of an initial execution image, also referred to as phase I or level I execution image. The initial execution image includes substantially the data to configure the (light) OS at the initial level of functionalities, and the rear view camera task, also referred to as the phase I or level I task. The initial execution image including the data to configure the (light) OS at the initial level of functionalities and the rear view camera task is pre-saved in persistent storage of the in-vehicle system as if it is a "suspended to persistent storage" image of a suspend process executed just prior to the last time the client/embedded computing platform was fully powered off. On resumption, with the (light) OS reconfigured at the initial level of functionalities, at block 406, execution control is transferred to the rear view camera task, to execute the rear view camera task.

In various embodiments, the imaginary "suspend process," and the resume process may be any one of a number of known suspend to and resume from persistent storage processes known in the art. The rear view camera task is a stateless task. Thus, the phase I booting, or booting of the in-vehicle system to the point with the rear view camera task available can be accomplished in a relatively short 2 seconds, for various currently available computing platforms.

Continuing to refer to FIG. 1, in various embodiments, while the initial task is being executed, at block 407, the OS is further initialized to be configurable to provide the next level of functionalities (plus), also referred to as phase II or level II functionalities.

Next, at block 408, on completion of execution of the rear view camera task, or on idling of the rear view camera task, another resumption process may be initiated to resume execution of an intermediate execution image, also referred to as phase II or level II execution image. The intermediate execution image includes substantially the data to configure the (plus) OS at the intermediate level of functionalities, and the intermediate task, also referred to as the phase II or level II task. The intermediate execution image including the data to configure the (plus) OS at the intermediate level of functionalities and the intermediate task is similarly pre-saved in persistent storage of the in-vehicle system as if it is a "suspended to persistent storage" image of a suspend process executed just prior to the last time the in-vehicle system was frilly powered off. On resumption, with the (plus) OS reconfigured at the intermediate level of functionalities, at block 410, execution control is transferred to the splash window (vendor logo) task, to execute the splash window (vendor logo) task. In various embodiments, the resumption of intermediate execution image may be performed in the background, and switched to the foreground when the resumption is complete and the splash window (vendor logo) task is available/ready for execution.

Similar to phase I or level I, the imaginary "suspend process," and the resume process employed for phase II or level II may be any one of a number of known suspend to and resume from persistent storage processes known in the art. The splash window (vendor logo) task is also be a stateless task. Thus, the phase II booting, or booting of the in-vehicle system to the point with the splash window (vendor logo) task available can be accomplished in a relatively short 4 seconds, slightly beyond 2 sec.

Still referring to FIG. 4, in various embodiments, while the splash window (vendor logo) task is being executed, at block 411, the OS is further initialized to be configurable to provide the full level of functionalities (with full graphics user interface (GUI) to support machine human interaction, also referred to as phase III or level III functionalities.

Next, at block 112, on completion of execution of the splash window (vendor logo) task, or on idling of the splash window (vendor logo) task, another resumption process may be initiated to resume execution of a full execution image, also referred to as phase III or level III execution image. The full execution image includes substantially the data to configure the OS at the full level of functionalities, and a plurality of operational tasks, also referred to as the phase III or level III tasks. The full execution image including the data to configure the OS at the full level of functionalities and the plurality of operational tasks is saved in persistent storage of the in-vehicle as part of a suspend process executed just prior to the last time the in-vehicle system was fully powered off. On resumption, with the OS reconfigured at the full level of functionalities, at block 414, execution control is transferred to one of operational tasks, to begin selective execution of the operational tasks. In various embodiments, the resumption of full execution image may be similarly performed in the background, and switched to the foreground when the resumption is complete and the plurality of operational tasks are available/ready for execution.

Similar to phases I and II or levels I & II, the suspend and resume processes employed for phase III or level III may be any one of a number of known suspend to and resume from persistent storage processes known in the art. With phase/level I and II achieved in relatively short 2 and 4 seconds, the phase III booting, or booting of the client/embedded computing platform to the point with the operational tasks available can be accomplished in due course in about 10 sec, in many currently available computing platform.

Figure 5:
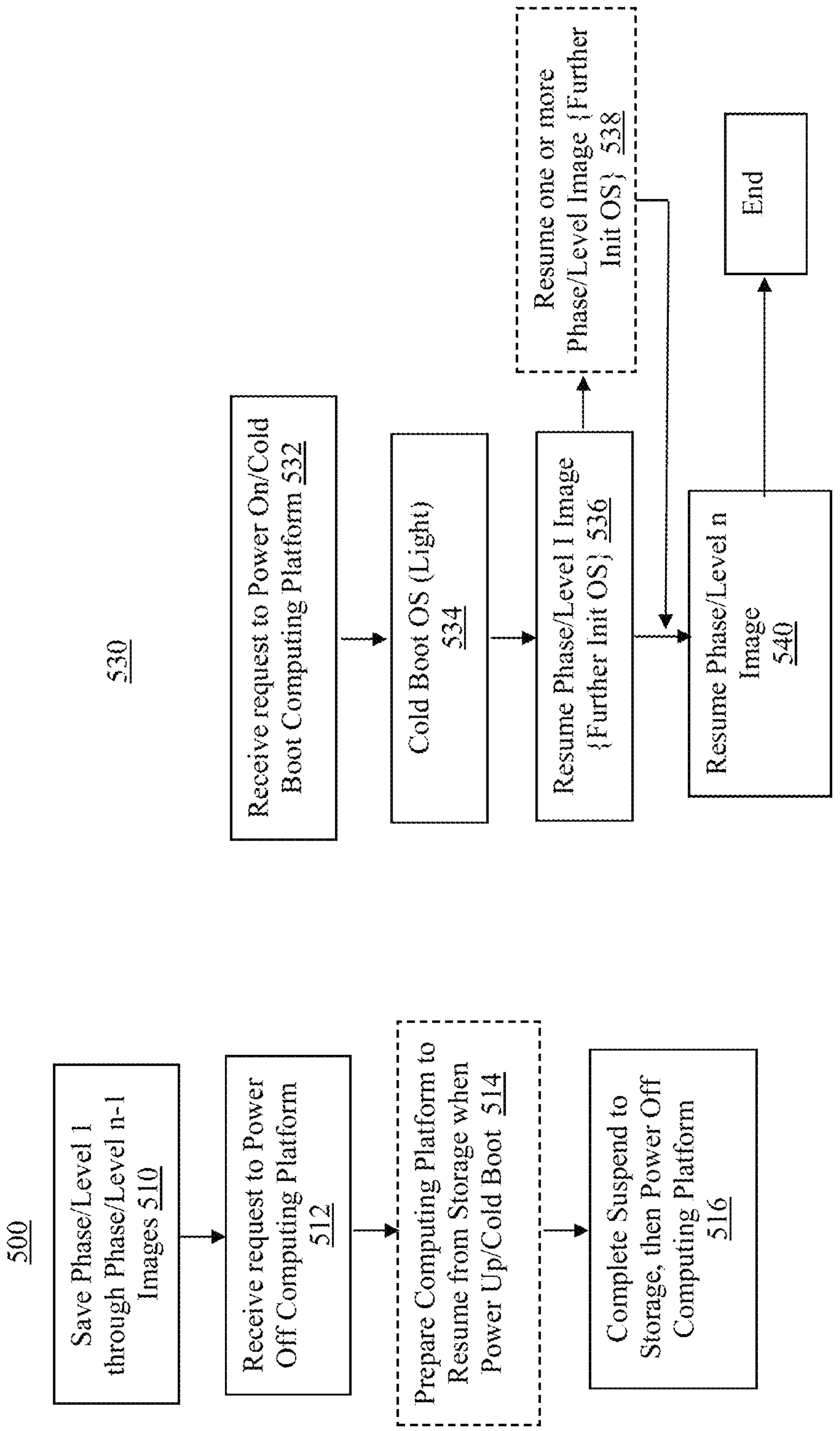
FIG. 5 illustrates an example each of a power off and a power on process, according to various embodiments.

Referring now to FIG. 5, wherein an example each of a power off and a power on process, according to various embodiments, is illustrated. As shown, for the illustrated embodiments, power off process 500 includes operations at blocks 510-516, whereas power on process 530 includes operations at blocks 530-540.

Process 500, for powering off a computing platform, starts at block 510. At block 510, prior to powering off of a computing platform, an execution image is pre-saved into persistent storage of the computing platform, for each of phase/level 1 through phase/level n−1 (the phase/level before the final phase/level Each of these execution images are saved as if they are a suspend to persistent storage image of a suspend process having data to configure the OS of the computing platform, on resumption, to a corresponding level of functionalities, and a task to be executed at the particular phase/level of boot. Typically, to facilitate fast boot, each phase/level OS is configured with substantially just enough function to support the execution of the task for the particular phase/level. Additionally, the tasks to be executed at phases/levels I through n−1 may be stateless to further speed up the boot time of each of the phases/levels.

Subsequently, at block 512, a power off request may be received by the computing platform, e.g., by the OS of the computing platform. At block 514, in lieu of proceeding directly to power off, a suspension process to suspend the computing platform to persistent storage is initiated. As part of the suspension process, various optional operations may be performed to prepare the computing platform to speed up subsequent resumption from persistent storage when later receive a power on or cold boot request. These various optional operations may include, but are not limited to, forcing various applications to release some or all of their allocated memories to reduce the amount of content has to be copied/saved from memory to persistent storage, or compress the amount of content to be copied/saved from memory to persistent storage, to reduce the amount of time required to suspend, as well as the amount of time required to resume. Further, the various optional operations may include prioritizing the contents to be copied/saved from memory to persistent storage, such that the higher priority content would be copied back first during a later resume process. Still further, the various optional operations may include signing the content to be copied/saved and/or encrypting the content to be copied/saved, to secure the content.

At block 516, on completion of the optional preparation operations, if any, the suspension process is completed. Thereafter, the computing platform is powered off.

Note that the operations at block 510 may need to be performed only once prior to the first power off, unless one of the resumption execution images of phase/level I through phase/level n−1 needs to be changed.

Still referring to FIG. 5, process 530, for powering up a computing platform, starts at block 532. At block 532, a request to power on or cold boot a computing platform is received, e.g., by a boot program of the computing platform. At block 534, as earlier described, the OS is cold booted to an initial level of functionalities (light). Next, at block 536, a resume process is initiated to resume a phase/level I execution image of the computing platform, configuring the OS to a phase/level I of functionalities, and executing a phase/level I task. In some embodiments, the OS may be further initialized to be configurable to another phase/level of functionalities, while the phase/level I task is being executed.

At block 538, the operations of block 536 is repeated one or more iterations for one or more additional phases/levels, successively resuming one or more suspended to persistent storage execution images for the one or more phases/levels, and executing a task for each of the one or more phases/levels. And during each execution, further initializing the OS to be configurable for the next phase/level, if necessary.

Finally, at block 540, the operations of block 536 is repeated for the final phase/level, resuming a suspended to persistent storage execution image for the final phase/level, and making available one or more operational tasks for execution.

Figure 6:
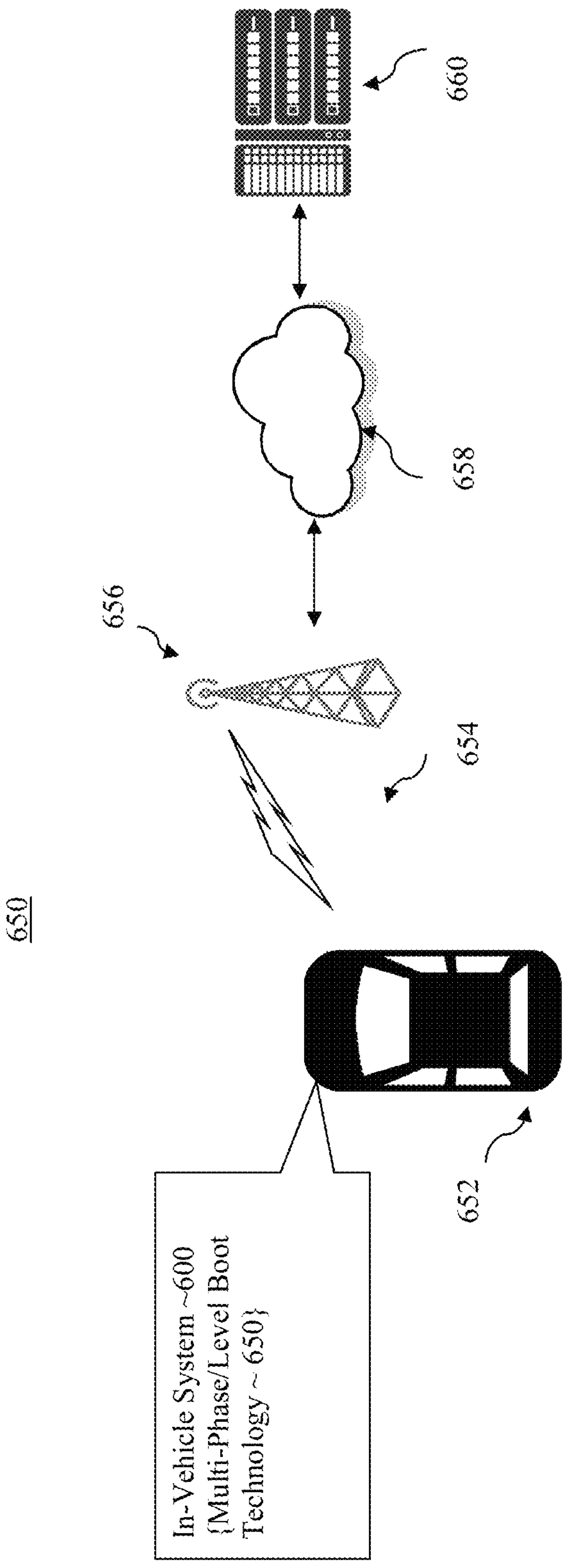
FIG. 6 illustrates an overview of an environment for incorporating and using the multi-level boot technology of the present disclosure, in accordance with various embodiments.

Referring now to FIG. 6, wherein an overview of an environment for incorporating and using the multi-phase/level boot technology of the present disclosure, in accordance with various embodiments, is shown. As illustrated, in embodiments, example environment 650 includes vehicle 652 having an engine, transmission, axles, wheels and so forth. Further, vehicle 652 includes IVI system 600 having a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications. Further, IVI system 600 is provided with multi-phase/level boot technology 650 of the present disclosure, allowing IVI system 600 to be powered off when the engine is turned off (also referred to as key offed), yet appears to be instantaneously available when IVI system 600 is powered on when the engine is turned on (also referred to as Key On).

In embodiments, IVI system 600, on its own or in response to the user interactions, may communicate or interact with one or more off-vehicle remote content servers 660, via a wireless signal repeater or base station on transmission tower 656 near vehicle 652, and one or more private and/or public wired and/or wireless networks 658. Examples of private and/or public wired and/or wireless networks 658 may include the Internet, the network of a cellular service provider, and so forth. It is to be understood that transmission tower 656 may be different towers at different times/locations, as vehicle 652 en routes to its destination.

Figure 7:
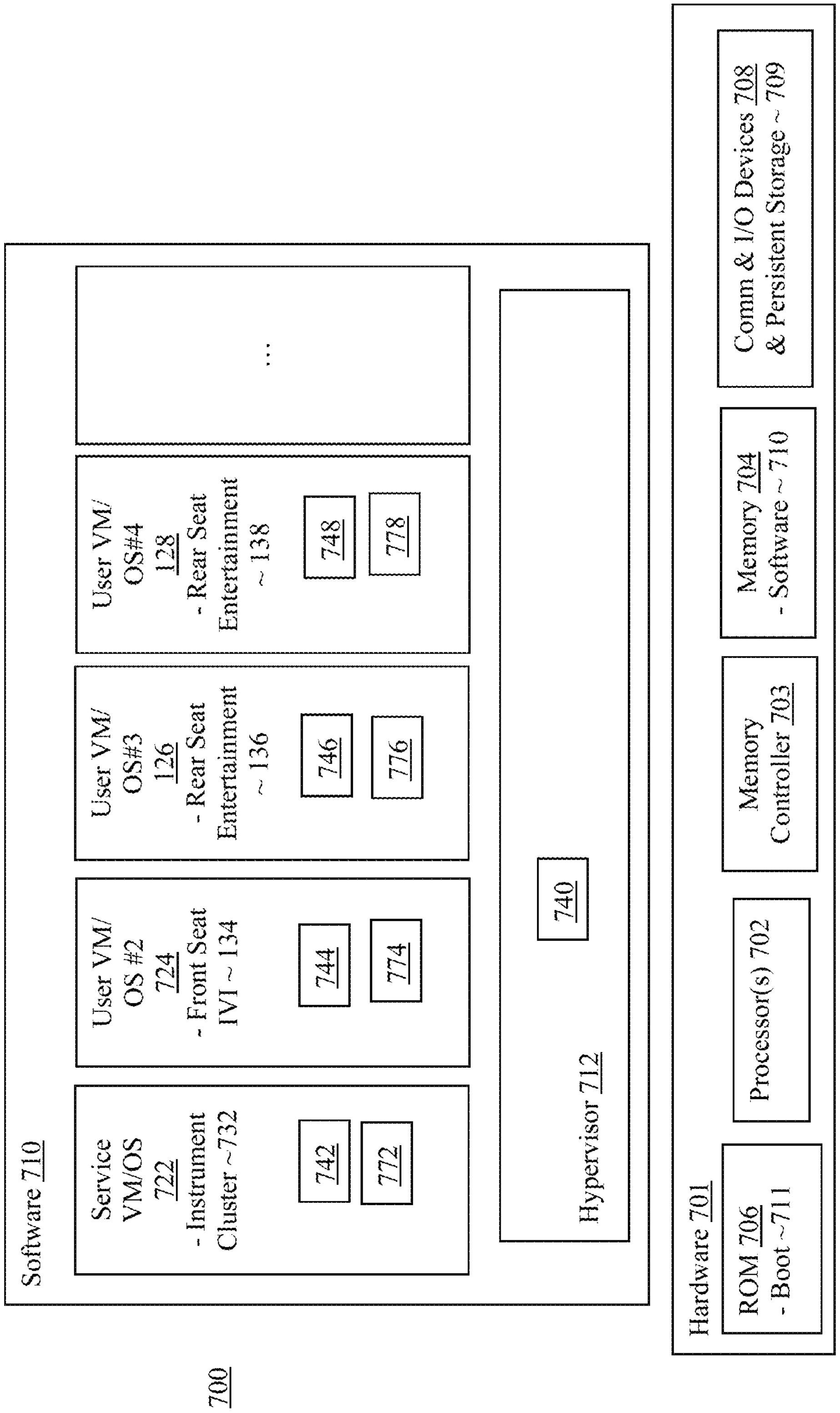
FIG. 7 illustrates a hardware/software view of the in-vehicle system of FIG. 6 in further details, according to various embodiments.

Referring now FIG. 7, wherein a hardware/software view of the in-vehicle system of FIG. 6, according to various embodiments, is shown in further details. As illustrated, for the embodiments, in-vehicle system 700 (which may be in-vehicle system 600) includes hardware 701 and software 710. Hardware 701 includes processor 702, memory controller 703, memory 704, read-only memory (ROM) 706, communication and/or input/output (I/O) devices 708 and persistent storage 709. Memory 704 includes software 710, while ROM 706 includes a boot program 711.

Software 710 includes hypervisor 712 hosting a number of VMs 722-728. Hypervisor 712 is configured to host execution of VMs 722-728. The VMs 722-728 include a service VM 722 and a number of user VMs 724-728. Service VM 722 includes a service OS hosting execution of a number of instrument cluster applications 732. User VMs 724-728 may include a user VM 724 having a user OS hosting execution of front seat infotainment applications 734, and a number of additional user VMs 726-728 having corresponding user OS hosting execution of corresponding rear seat entertainment application 736-738 and so forth.

To enable in-vehicle system 700 to be powered off, when the engine of vehicle 652 is keyed off, yet appears to be instantaneously available to a user when in-vehicle system 700 is powered on, when the engine of vehicle 652 is keyed on, software 710 is incorporated with multi-phase/level boot technology 650 of the present disclosure. To effectuate the desired powered off and yet appears to be instantaneously available at power on, in embodiments, the various components of the multi-phase/level boot technology 650 are arranged to initiate a suspense to storage process during power off, to suspend SVM 722 to persistent storage, before powering off IVI system 700, and at power on, the boot process go through multi-phase/level boot, successively resuming the OS of SVM 722 to one or more phases/levels and executing one or more time sensitive tasks at the one or more phases/levels.

In embodiments, to facilitate power management, each of hypervisor 712 and OS of VMs 722-728 may include a power manager 740-746. In embodiments, power managers 740-746 are configured to manage power states of hypervisor 712 and VMs 722-728 in compliant with the Advanced Configuration and Power Interface (ACPI) standard. That is, power managers 740-746 are configured to suspend and resume hypervisor 712 and VMs 722-728 to and from a S3 suspend state (also referred to as sleep or hibernation state), as well as placing the computing platform into a S4 power off state, in compliant with the ACPI standard. In embodiments, each OS of service VM 722 and user VM 724-728 may further include a memory manager 772-778 to manage allocation of memory to various services and/or applications running within the respective VMs.

Except for multi-phase/level boot technology 650 of the present disclosure incorporated IVI system 700, elements 702-708 of hardware 701 and elements 712-738 of software 710 may be any one of a number of these elements known in the art. For example, processor 702 may be any one of a number of multi-core processors known in the art, such as those available from Intel® of Santa Clara, Calif. Memory 104 may be any one of a number of volatile memory known in the art, including traditional dynamic random access memory (DRAM) or advanced cross point memory. Memory controller 703 may simply provide access control, that is read and/or write to memory 704, or including advanced functions, such as encryption/decryption services. ROM 706 may be any one of a number of persistent read only memory known in the art, such as but not limited to Electrically Erasable Programmable Read-Only Memory (EEPROM). Boot program 711 may likewise be any one of a number of boot programs known in the art, such as a primary or secondary boot loader (SBL), a multi-boot program, e.g., Grub, or an automotive boot loader (ABL). Boot program 711 may be part of a basic input/input system (BIOS).

Communication and I/O devices 708 may include any number of communication and I/O devices known in the art. Examples of communication devices may include, but are not limited to, networking interfaces for Bluetooth®, Near Field Communication (NFC), WiFi, Cellular communication (such as LTE, 4G, or 5G) and so forth. Examples of I/O devices may include, but are not limited to, persistent storage 709, display, keyboards, cursor control (mouse, trackball, etc), and so forth. In embodiments, persistent storage 709 may be used to provide swap space for swapping memory content out of memory 704, to allow that portion of memory 704 to be re-allocated for other use, or memory 704 to be shut down. Persistent storage 709 may also be used to store memory contents when computing platform of in-vehicle system 700 is suspended to storage.

Hypervisor 712 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 722 and user OS of user VMs 724-728 may be any one of a number of OS known in the art, such as Linux, available e.g., from Red Hat Enterprise of Raliegh, N.C., or Android, available from Google of Mountain View, Calif.

In various embodiments, processor(s) 702, ROM 706, memory controller 703 and some communication & I/O devices 708 may be part of a system-on-chip (SoC). For some of these embodiments, the SoC may further include graphics processor, computer vision and/or deep machine learning accelerators.

Figure 8:
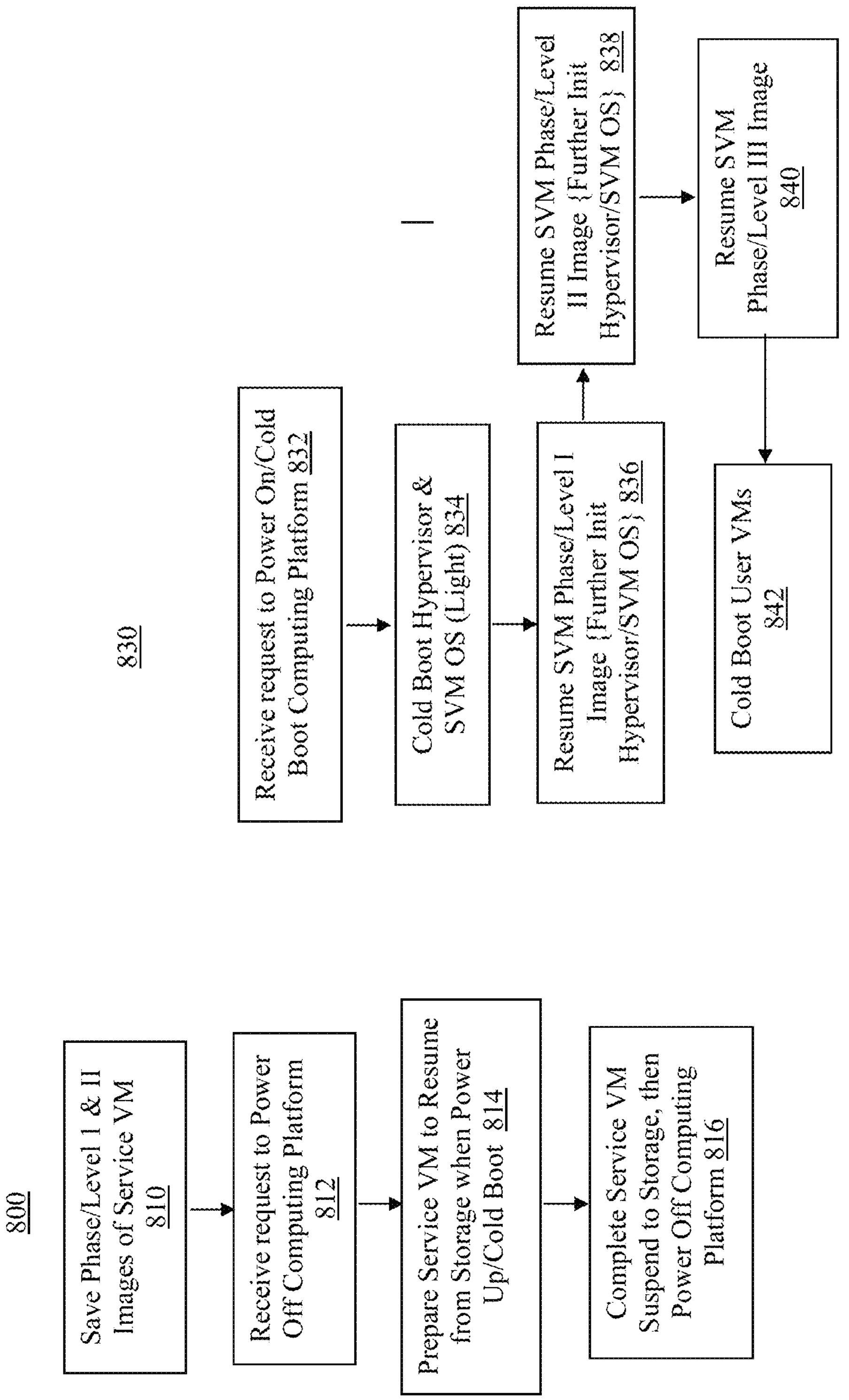
FIG. 8 illustrates an example each of a power off and a power on process, according to various embodiments.

Referring now to FIG. 8, wherein an example each of a power off and a power on process suitable for practice by IVI system 600/700, according to various embodiments, is illustrated. As shown, for the illustrated embodiments, power off process 800 includes operations at blocks 810-816, whereas power on process 830 includes operations at blocks 830-840.

Process 800, for powering off a computing platform, starts at block 810. At block 810, prior to powering off of a computing platform, an execution image is pre-saved into persistent storage of the computing platform, for phase/level 1 and phase/level 2. Each of these execution images are saved as if they are a resumption execution image having data to configure the OS of the computing platform to a corresponding level of functionalities, and a task to be executed at the particular phase/level of boot. More specifically, the task for phase/level I is a stateless rear view camera task, and the task for phase/level II is a stateless splash window (vendor logo) task. For the illustrated embodiments, to facilitate fast boot, each phase/level OS is configured with substantially just enough function to support the execution of the task for the particular phase/level.

Subsequently, at block 812, a power off request may be received by the computing platform, e.g., by the OS of the SVM the computing platform. At block 814, in lieu of proceeding directly to power off, a suspension process to suspend the SVM to persistent storage is initiated. As part of the suspension process, various optional operations may be performed to prepare the SVM to resume from persistent storage when later receive a power on or cold boot request. These various optional operations, as described earlier, may include, but are not limited to, forcing various instrument cluster applications of the SVM to release some or all of their allocated memories to reduce the amount of content has to be copied/saved from memory to persistent storage, or compress the amount of content to be copied/saved from memory to persistent storage, to reduce the amount of time required to suspend, as well as the amount of time required to resume. Further, the various optional operations may include prioritizing the contents to be copied/saved from memory to persistent storage, such that the higher priority content would be copied back first during a later resume process. Still further, the various optional operations may include signing the content to be copied/saved and/or encrypting the content to be copied/saved, to secure the content.

At block 816, on completion of the optional preparation operations, if any, the suspension process for the SVM is completed. Thereafter, the computing platform is powered off.

Note that the operations at block 810 may need to be performed only once prior to the first power off, unless one of the resumption execution images of phase/level I through phase/level II needs to be changed.

Still referring to FIG. 8, process 830, for powering up a computing platform, starts at block 832. At block 832, a request to power on or cold boot a computing platform is received, e.g., by the boot program of the computing platform. At block 834, first the hypervisor, then the OS of the SVM are cold respectively booted to an initial level of functionalities (light). Next, at block 836, a resume process is initiated to resume a phase/level I execution image of the OS of the SVM, configuring the OS of the SVM to a phase/level I of functionalities, and executing the phase/level I rear view camera task. In some embodiments, the hypervisor and/or the OS of the SVM may be further initialized to be configurable to another phase/level of functionalities, while the phase/level I rear view camera task is being executed.

At block 838, the operations of block 836 is repeated to resume the phase/level II suspended to persistent storage execution images, and executing the phase/level II task, splash window. And during the execution, the hypervisor and the OS of the SVM to be configurable for the next phase/level, is further initialized.

At block 840, the operations of block 836 is repeated for the final phase/level, resuming a suspended to persistent storage execution image for the final phase/level, and making available one or more operational tasks for execution.

At block 842, one of more user VMs are cold booted.

Figure 9:
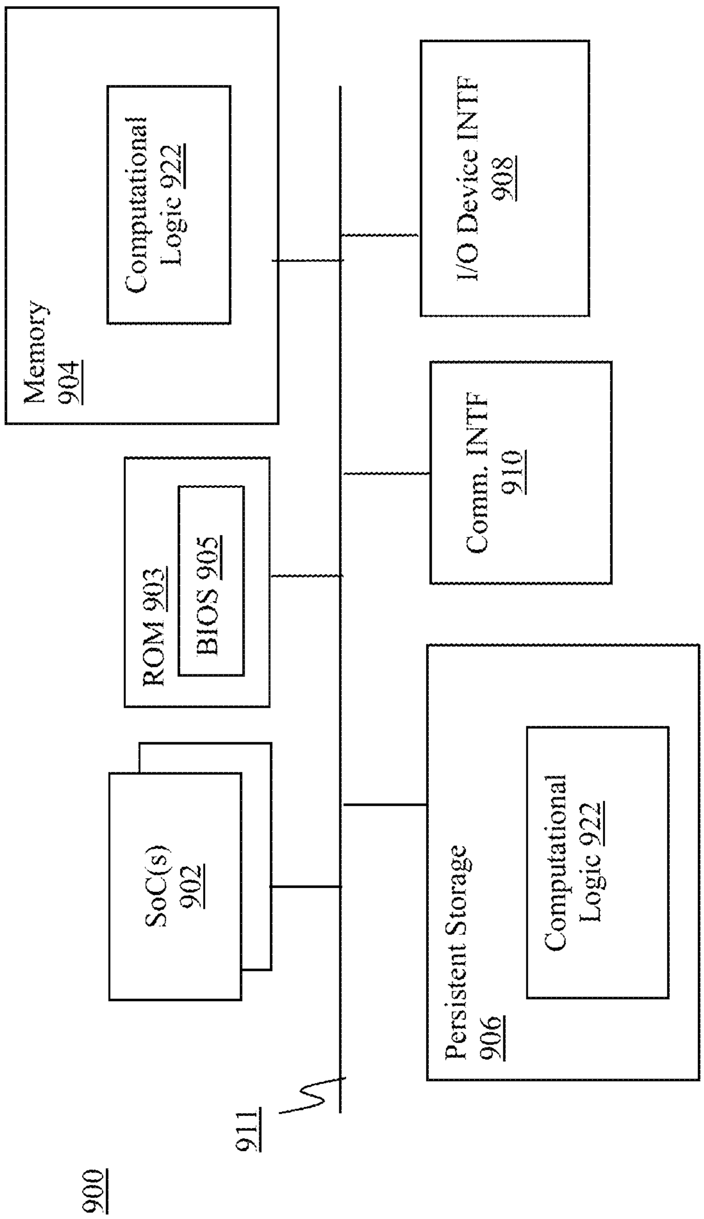
FIG. 9 illustrates an example computing platform suitable for use to practice aspects of the present disclosure, according to various embodiments.

FIG. 9 illustrates an example computing platform that may be suitable for use to practice selected aspects of the present disclosure. As shown, computing platform 900 includes one or more system-on-chip (SoC) 902, each having one or more processor cores, graphics unit, computer vision and/or deep machine learning accelerators. Additionally, computing platform 900 may include ROM 903, which may be any one of a number of ROM known in the art, and system memory 904 may be any one of a number of volatile storage known in the art. In alternate embodiments, read-only memory (ROM) 903, and system memory 904 may be part of SoC 902.

Further, computing system 900 may include persistent storage devices 906. Example of persistent storage devices 906 may include, but are not limited to, flash drives, hard drives, compact disc read-only memory (CD-ROM) and so forth. Further, computer system 900 may include input/output devices 908 (such as display, keyboard, cursor control and so forth) and communication interfaces 910 (such as network interface cards, modems and so forth). The elements may be coupled to each other via system bus 912, which may represent one or more buses. In the case of multiple buses, they may be bridged by one or more bus bridges (not shown).

Each of these elements may perform its conventional functions known in the art. In particular, ROM 903 may include basic input/output system services (BIOS) 905 having a boot loader. System memory 904 and mass storage devices 906 may be employed to store a working copy and a permanent copy of the programming instructions implementing the operations associated with hypervisor 712, service/user OS of service/user VM 722-728, including the respective power managers, collectively referred to as computational logic 922. The various elements may be implemented by assembler instructions supported by processor(s) of SoC 902 or high-level languages, such as, for example, C, that can be compiled into such instructions.

Figure 10:
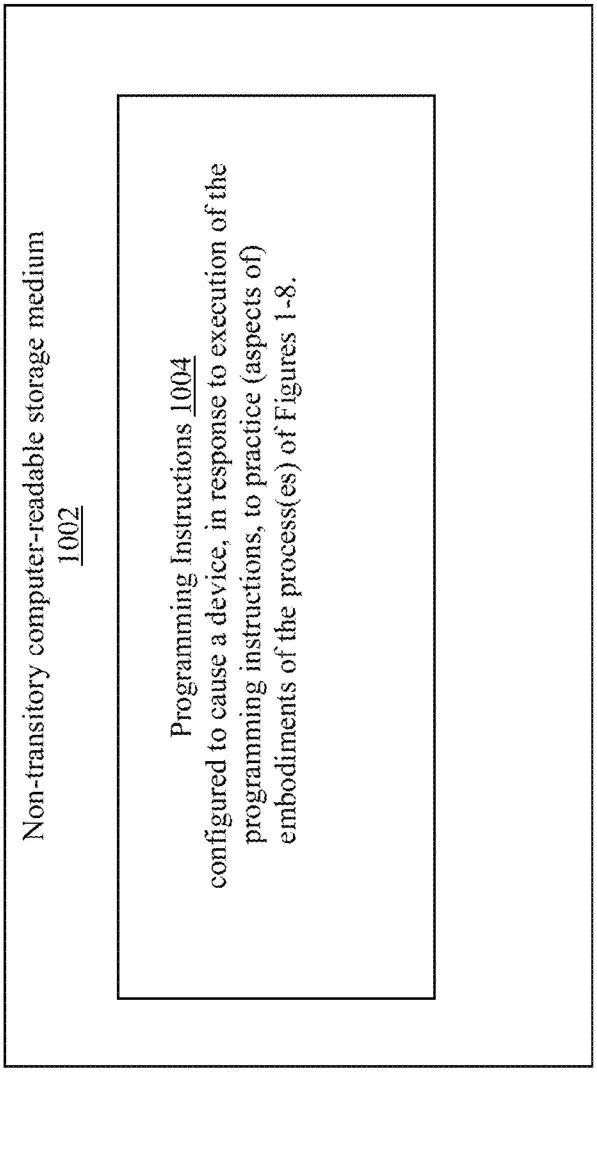
FIG. 10 illustrates a storage medium having instructions for practicing methods described with references to FIGS. 1-8, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., computing platform 900, in response to execution of the programming instructions, to implement (aspects of) boot program 711, hypervisor 712, service/user OS of service/user VM 722-728, including the respective power managers. In alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the tell is "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 9, for one embodiment, at least one of processors of SoC 902 may be packaged together with memory having aspects of computing logic 922. For one embodiment, at least one of processors of SoC 902 may be packaged together with memory having aspects of computing logic 922, to form a System in Package (SiP). For one embodiment, at least one of processors of SoC 902 may be integrated on the same die with memory having aspects of computing logic 922. For one embodiment, at least one of processors of SoC 902 may be packaged together with memory having aspects of computing logic 922, to form the SoC.

Thus various example embodiments of the present disclosure have been described including, but are not limited to:

Example 1 is at least one computer-readable medium (CRM) having instructions stored therein, to cause a computing platform, in response to execution of the instruction by the computing platform, to operate an operating system to: receive execution control, after the operating system has been booted to an initial level of functionalities; and on receipt of execution control, in lieu of booting the rest of the operating system, initiate a resume process to resume an initial execution image from persistent storage accessible to the computing platform, the initial execution image having a stateless initial task, and having been pre-saved in the persistent storage as if it is a suspend to persistent storage image of a suspend process performed immediately before the computing platform was last powered off with the computing platform having only the operating system at the initial level of functionalities, and the stateless initial task.

Example 2 is example 1, wherein the portion of the operating system that provides the first level of functionalities are loaded into first response ones of an initial set of memory slots of memory of the computing platform; and wherein to resume the initial execution image comprises to load or reload the initial execution image into second respective ones of the initial set of memory slots of memory of the computing platform.

Example 3 is example 1, wherein the computing platform is further caused to operate the operating system to transfer execution control to the stateless initial task, on loading or re-loading the initial execution image having the stateless initial task, to execute the stateless initial task.

Example 4 is example 3, wherein the computing platform is further caused to operate the operating system to initialize the operating system to an intermediate level of functionalities more capable then the initial level of functionalities, while the stateless initial task is being executed.

Example 5 is example 3, wherein the computing platform is further caused to operate the operating system to initiate another resume process to resume an intermediate execution image from the persistent storage, the intermediate execution image having a stateless intermediate task, and having been pre-saved in the persistent storage as if it is a suspend to persistent storage image of a suspend process performed immediately before the computing platform was last powered off with the computing platform having only the operating system at the intermediate level of functionalities, and the stateless intermediate task.

Example 6 is example 5, wherein to resume the intermediate execution images comprises to load or reload the portion of the operating system that provides the intermediate level of functionalities beyond the initial level of functionalities, and the intermediate execution image into respective ones of an intermediate set of memory slots of memory of the computing platform.

Example 7 is example 5, wherein the computing platform is further caused to operate the operating system to transfer execution control to the stateless intermediate task, on loading or re-loading the operating system to the intermediate level of functionalities, and the intermediate execution image having the stateless intermediate task, to execute the intermediate task.

Example 8 is example 4, wherein the computing platform is further caused to operate the operating system to initialize the operating system to its full functionalities, while the stateless initial task is being executed, or after the stateless initial task has been executed.

Example 9 is example 4, wherein the computing platform is further caused to operate the operating system to initiate another resume process to resume a full execution image from the persistent storage, the full execution image having a plurality of operational tasks, and having been saved in the persistent storage as part of a suspend process performed immediately before the computing platform was last powered off with the computing platform having the operating system at a full level of functionalities and the plurality of operational tasks.

Example 10 is example 9, wherein to resume the full execution images comprises loading or reloading the portion of the operating system that provides the full level of functionalities beyond at least the initial level of functionalities, and the final execution image into respective ones of a plurality of memory slots of memory of the computing platform Example 11 is example 10, wherein the computing platform is further caused to operate the operating system to transfer execution control to one of the operational tasks, on loading or re-loading the operating system to the full level of functionalities, and the full execution image having the plurality of operational tasks, to execute the plurality of operational tasks.

Example 12 is a method of computing, comprising: resuming an initial execution image of a computing platform from persistent storage of the computing platform to execute an initial task, the initial execution image having the initial task, and having been pre-saved in the persistent storage as if it is a suspend to persistent storage image of a suspend process performed immediately before the computing platform was last powered off with the computing platform having only an operating system at an initial level of functionalities, and the initial task; and subsequently, resuming a full execution image of the computing platform from the persistent storage to execute one of a plurality of operational tasks, the full execution image having the plurality of operational tasks, and having been pre-saved in the persistent storage as part of a suspend process performed immediately before the computing platform was last powered off with the computing platform having the operating system at a full level of functionalities with more functionalities than the initial level of functionalities, and the plurality of operational tasks.

Example 13 is example 12, further comprising initializing the operating system to the initial level of functionalities prior to the resuming of the initial execution image from the persistent storage of the computing platform; and transferring execution control to the initial task, on loading or re-loading the operating system to the initial level of functionalities, and the initial execution image having the initial task, to execute the initial task.

Example 14 is example 12, further comprising subsequent to execution of the initial task, but prior to resuming the full execution image of the computing platform, resuming an intermediate execution image of the computing platform from persistent storage of the computing platform to execute an intermediate task, the intermediate execution image having the intermediate task, and having been pre-saved in the persistent storage as if it is a suspend to persistent storage image of a suspend process performed immediately before the computing platform was last powered off with the computing platform having the operating system at an intermediate level of functionalities with more functions than the initial level of functionalities but less functions than the full level of functionalities, and the plurality of operational tasks.

Example 15 is an apparatus for computing, comprising: a computing platform disposed in a vehicle, having a hypervisor to host a service virtual machine (SVM) and one or more user virtual machines (UVMs); a boot program, integral of the computing platform, to receive a request to power on or boot the computing platform, wherein the boot program, in response to receipt of the request, booting the hypervisor to an initial level of functionalities, which on having been booted to the initial level of functionalities, launches the SVM and initializes an operating system (OS)

of the SVM to an initial level of functionalities; and the OS of the SVM, wherein on receipt of execution control after the OS has been initialized to the initial level of functionalities, the OS, in lieu of booting the rest of the OS, initiates a resume process to resume an initial execution image from persistent storage of the computing platform, the initial execution image having an initial task, and having been pre-saved in the persistent storage as if it is a suspend to persistent storage image of a suspend process performed immediately before the SVM was last shut down with the SVM having only the OS at the initial level of functionalities, and the initial task.

Example 16 is example 15, wherein the initial task comprises a rear view camera task, and the SVM, at a full operational state, hosts a plurality of instrument cluster tasks; and wherein the OS of the SVM is to further transfer execution control to the rear view camera, on loading or re-loading the initial execution image having the rear view camera task, to execute the rear view camera task.

Example 17 is example 15, wherein to boot the hypervisor to the initial level of functionalities, the boot program loads the portion of the hypervisor that provides the initial level of functionalities into first respective ones of an initial set of memory slots of memory of the computing platform; wherein to initialize the OS of the SVM to the initial level of functionalities, the hypervisor loads the portion of the OS of the SVM that provides the initial level of functionalities into second respective ones of the initial set of memory slots of memory of the computing platform, and wherein to resume the initial execution image, the OS of the SVM loads or reloads the initial execution image into third respective ones of the initial set of memory slots of memory of the computing platform.

Example 18 is example 17, wherein the hypervisor or the OS of the SVM is to further initialize the hypervisor or the OS of the SVM to an intermediate level of functionalities more capable their respective initial level of functionalities, while the initial task is being executed.

Example 19 is example 17, wherein the OS of the SVM is to further initiate another resume process to resume an intermediate execution image from the persistent storage, the intermediate execution image having an intermediate task, and having been pre-saved in the persistent storage as if it is a suspend to persistent storage image of a suspend process performed immediately before the SVM was last shut down with the SVM having only the OS at the intermediate level of functionalities, and the intermediate task.

Example 20 is example 19, wherein the intermediate task comprises a splash window task, and the SVM, at a full operational state, is to host a plurality of instrument cluster tasks; and wherein the OS is to further transfer execution control to the splash window task, on loading or re-loading the intermediate execution image having the splash window task, to execute the splash window task.

Example 21 is example 19, wherein to resume the intermediate execution images comprises loading or reloading the intermediate execution image into respective ones of an intermediate set of memory slots of memory of the computing platform Example 22 is example im 19, wherein the hypervisor or the OS of the SVM is to further initialize the hypervisor or the OS of the SVM to its full functionalities, while the initial task is being executed, or after the initial task has been executed.

Example 23 is example 17, wherein the OS of the SVM is to initiate another resume process to resume a full execution image from the persistent storage, the full execution image having a plurality of operational tasks, and having been pre-saved in the persistent storage as part of a suspend process performed immediately before the SVM was last shut down, with the SVM having the OS at a full level of functionalities and the plurality of operational tasks.

Example 24 is example 23, wherein to resume the full execution images comprises loading or reloading the portion of the OS that provides the full level of functionalities beyond at least the initial level of functionalities, and the full execution image into respective ones of a plurality of memory slots of memory of the computing platform Example 25 is example 23, wherein the OS of the SVM is to transfer execution control to one of the operational tasks, on loading or re-loading the OS of the SVM to the full level of functionalities, and the full execution image having the plurality of operational tasks, to execute the plurality of operational tasks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. At least one non-transitory computer-readable medium (CRM) having instructions stored therein, to cause a computing platform, in response to execution of the instructions by the computing platform, to operate an operating system to:

receive execution control, after the operating system has been booted to an initial level of functionalities;

on receipt of execution control, in lieu of booting the rest of the operating system, initiate a resume process to resume an initial execution image from persistent storage accessible to the computing platform, the initial execution image having a stateless initial task, and having been pre-saved in the persistent storage as if it is a suspend to persistent storage image of a suspend process performed immediately before the computing platform was last powered off with the computing platform having only the operating system at the initial level of functionalities, and the stateless initial task, the operating system to load the initial execution image into a plurality of memory slots; and following resumption of the initial execution image, resume an intermediate execution image from the persistent storage, the intermediate execution image having a stateless intermediate task, the operating system to resume the intermediate execution image by loading the intermediate execution image into a subset of the plurality of memory slots, and the remainder of the plurality of memory slots remain with untouched portions of the initial execution image.

2. The CRM of claim 1, wherein the portion of the operating system that provides the initial level of functionalities are loaded into first response ones of an initial set of memory slots of the plurality of memory slots of the computing platform; and wherein to resume the initial execution image comprises to load or reload the initial execution image into second respective ones of the initial set of memory slots of the plurality of memory slots of the computing platform.

3. The CRM of claim 1, wherein the computing platform is further caused to operate the operating system to transfer execution control to the stateless initial task, on loading or re-loading the initial execution image having the stateless initial task, to execute the stateless initial task.

4. The CRM of claim 3, wherein the computing platform is further caused to operate the operating system to initialize the operating system to an intermediate level of functionalities more capable then the initial level of functionalities, while the stateless initial task is being executed.

5. The CRM of claim 4, wherein the computing platform is further caused to operate the operating system to initialize the operating system to its full functionalities, while the stateless initial task is being executed, or after the stateless initial task has been executed.

6. The CRM of claim 4, wherein the computing platform is further caused to operate the operating system to initiate another resume process to resume a full execution image from the persistent storage, the full execution image having a plurality of operational tasks, and having been saved in the persistent storage as part of a suspend process performed immediately before the computing platform was last powered off with the computing platform having the operating system at a full level of functionalities and the plurality of operational tasks.

7. The CRM of claim 6, wherein to resume the full execution image comprises loading or reloading the portion of the operating system that provides the full level of functionalities beyond at least the initial level of functionalities, and a final execution image into respective ones of the plurality of memory slots of memory of the computing platform.

8. The CRM of claim 7, wherein the computing platform is further caused to operate the operating system to transfer execution control to one of the operational tasks, on loading or re-loading the operating system to the full level of functionalities, and the full execution image having the plurality of operational tasks, to execute the plurality of operational tasks.

9. The CRM of claim 3, wherein the intermediate execution image having been pre-saved in the persistent storage as if it is a suspend to persistent storage image of a suspend process performed immediately before the computing platform was last powered off with the computing platform having only the operating system at an intermediate level of functionalities, and the stateless intermediate task.

10. The CRM of claim 9, wherein the computing platform is further caused to operate the operating system to transfer execution control to the stateless intermediate task, on loading or re-loading the operating system to the intermediate level of functionalities, and the intermediate execution image having the stateless intermediate task, to execute the intermediate task.

11. A method of computing, comprising:

resuming an initial execution image of a computing platform from persistent storage of the computing platform to execute an initial task, the initial execution image having the initial task, and having been pre-saved in the persistent storage as if it is a suspend to persistent storage image of a suspend process performed immediately before the computing platform was last powered off with the computing platform having only an operating system at an initial level of functionalities, and the initial task; and subsequently, resuming a full execution image of the computing platform from the persistent storage to execute one of a plurality of operational tasks, the full execution image having the plurality of operational tasks, and having been pre-saved in the persistent storage as part of a suspend process performed immediately before the computing platform was last powered off with the computing platform having the operating system at a full level of functionalities with more functionalities than the initial level of functionalities, and the plurality of operational tasks, wherein resuming the initial execution image comprises loading the initial execution image into a plurality of memory slots, and resuming the full execution image comprises loading the full execution image into a subset of the plurality of memory slots, and the remainder of the plurality of memory slots remain with untouched portions of the initial execution image.

12. The method of claim 11, further comprising:

initializing the operating system to the initial level of functionalities prior to the resuming of the initial execution image from the persistent storage of the computing platform; and transferring execution control to the initial task, on loading or re-loading the operating system to the initial level of functionalities, and the initial execution image having the initial task, to execute the initial task.

13. The method of claim 11, further comprising subsequent to execution of the initial task, but prior to resuming the full execution image of the computing platform, resuming an intermediate execution image of the computing platform from persistent storage of the computing platform to execute an intermediate task, the intermediate execution image having the intermediate task, and having been pre-saved in the persistent storage as if it is a suspend to persistent storage image of a suspend process performed immediately before the computing platform was last powered off with the computing platform having the operating system at an intermediate level of functionalities with more functions than the initial level of functionalities but less functions than the full level of functionalities, and the plurality of operational tasks.

14. An apparatus for computing, comprising:

a computing platform disposed in a vehicle, having a hypervisor to host a service virtual machine (SVM) and one or more user virtual machines (UVMs);

a boot program, integral of the computing platform, to receive a request to power on or boot the computing platform, wherein the boot program, in response to receipt of the request, booting the hypervisor to an initial level of functionalities, which on having been booted to the initial level of functionalities, launches the SVM and initializes an operating system (OS) of the SVM to an initial level of functionalities; and the OS of the SVM, wherein on receipt of execution control after the OS has been initialized to the initial level of functionalities, the OS, in lieu of booting the rest of the OS, initiates a resume process to resume an initial execution image from persistent storage of the computing platform, the initial execution image having an initial task, and having been pre-saved in the persistent storage as if it is a suspend to persistent storage image of a suspend process performed immediately before the SVM was last shut down with the SVM having only the OS at the initial level of functionalities, and the initial task, wherein to boot the hypervisor to the initial level of functionalities, the boot program loads the portion of the hypervisor that provides the initial level of functionalities into first respective ones of an initial set of memory slots of memory of the computing platform; wherein to initialize the OS of the SVM to the initial level of functionalities, the hypervisor loads the portion of the OS of the SVM that provides the initial level of functionalities into second respective ones of the initial set of memory slots of memory of the computing platform, and wherein to resume the initial execution image, the OS of the SVM loads or reloads the initial execution image into third respective ones of the initial set of memory slots of memory of the computing platform.

15. The apparatus of claim 14, wherein the initial task comprises a rearview camera task, and the SVM, at a full operational state, hosts a plurality of instrument cluster tasks; and wherein the OS of the SVM is to further transfer execution control to a rearview camera, on loading or re-loading the initial execution image having the rearview camera task, to execute the rearview camera task.

16. The apparatus of claim 14, wherein the hypervisor or the OS of the SVM is to further initialize the hypervisor or the OS of the SVM to an intermediate level of functionalities more capable their respective initial level of functionalities, while the initial task is being executed.

17. The apparatus of claim 14, wherein the OS of the SVM is to further initiate another resume process to resume an intermediate execution image from the persistent storage, the intermediate execution image having an intermediate task, and having been pre-saved in the persistent storage as if it is a suspend to persistent storage image of a suspend process performed immediately before the SVM was last shut down with the SVM having only the OS at an intermediate level of functionalities, and the intermediate task.

18. The apparatus of claim 17, wherein the intermediate task comprises a splash window task, and the SVM, at a full operational state, is to host a plurality of instrument cluster tasks; and wherein the OS is to further transfer execution control to the splash window task, on loading or re-loading the intermediate execution image having the splash window task, to execute the splash window task.

19. The apparatus of claim 17, wherein to resume the intermediate execution image comprises loading or reloading the intermediate execution image into respective ones of an intermediate set of memory slots of memory of the computing platform.

20. The apparatus of claim 17, wherein the hypervisor or the OS of the SVM is to further initialize the hypervisor or the OS of the SVM to its full functionalities, while the initial task is being executed, or after the initial task has been executed.

21. The apparatus of claim 14, wherein the OS of the SVM is to initiate another resume process to resume a full execution image from the persistent storage, the full execution image having a plurality of operational tasks, and having been pre-saved in the persistent storage as part of a suspend process performed immediately before the SVM was last shut down, with the SVM having the OS at a full level of functionalities and the plurality of operational tasks.

22. The apparatus of claim 21, wherein to resume the full execution image comprises loading or reloading the portion of the OS that provides the full level of functionalities beyond at least the initial level of functionalities, and the full execution image into respective ones of a plurality of memory slots of memory of the computing platform.

23. The apparatus of claim 21, wherein the OS of the SVM is to transfer execution control to one of the operational tasks, on loading or re-loading the OS of the SVM to the full level of functionalities, and the full execution image having the plurality of operational tasks, to execute the plurality of operational tasks.

* * * * *